US010246244B2

(12) United States Patent
Balfour et al.

(10) Patent No.: US 10,246,244 B2
(45) Date of Patent: Apr. 2, 2019

(54) GRASPING CONTAINER LID AND APPLICATIONS THEREOF

(71) Applicant: Design Engineering LLC, Tempe, AZ (US)

(72) Inventors: Walter Edwin Balfour, Chandler, AZ (US); Adam Lee Craft, Phoenix, AZ (US); Zachary Fanning, Tempe, AZ (US)

(73) Assignee: Design Engineering LLC, Tempe, AZ (US)

( * ) Notice: Subject to any disclaimer, the term of this patent is extended or adjusted under 35 U.S.C. 154(b) by 0 days.

(21) Appl. No.: 15/648,897

(22) Filed: Jul. 13, 2017

(65) Prior Publication Data

US 2018/0086546 A1 Mar. 29, 2018

Related U.S. Application Data

(60) Provisional application No. 62/400,741, filed on Sep. 28, 2016.

(51) Int. Cl.
*B65D 83/04* (2006.01)
*B65D 43/02* (2006.01)
(Continued)

(52) U.S. Cl.
CPC ....... *B65D 83/049* (2013.01); *B65D 43/0202* (2013.01); *B65D 51/24* (2013.01);
(Continued)

(58) Field of Classification Search
CPC .. B65D 83/049; B65D 83/04; B65D 83/0418; B65D 85/62; B65D 51/24;
(Continued)

(56) References Cited

U.S. PATENT DOCUMENTS 2,804,203 A * 8/1957 Harkness ......... A61B 17/06128
206/63.3
2,934,409 A * 4/1960 Biehl ....................... B01J 4/001
116/200
(Continued)

FOREIGN PATENT DOCUMENTS

FR 968094 A * 11/1950 ........... B65D 83/049

OTHER PUBLICATIONS

Translation of FR968094A, Dupont, Nov. 17, 1950, p. 4.*

*Primary Examiner* — Robert J Hicks
(74) *Attorney, Agent, or Firm* — Garlick & Markison; Timothy W. Markison

(57) ABSTRACT

A container lid with a finger entry section, a thumb entry section, a grasping section, and a mating section. The finger entry section includes a finger opening for receiving at least one finger of a hand. The thumb entry section includes a thumb opening for receiving a thumb of the hand. The grasping section is coupled to the finger entry section and the thumb entry section. The grasping section functions to grasp an item when compressed via the finger entry section and the thumb entry section and collectively prevent the finger(s) and the thumb from making direct contact with the item. The mating section is coupled to the finger entry section, the thumb entry section, and/or the grasping section and functions to mate the container lid with a container body.

19 Claims, 6 Drawing Sheets

(51) Int. Cl.
  *B65D 51/24* (2006.01)
  *B65D 85/62* (2006.01)
  *C02F 1/68* (2006.01)
  *C02F 1/76* (2006.01)
  *E04H 4/12* (2006.01)
  *G01F 23/292* (2006.01)
  *C02F 103/42* (2006.01)

(52) U.S. Cl.
  CPC .............. *B65D 85/62* (2013.01); *C02F 1/686* (2013.01); *C02F 1/688* (2013.01); *C02F 1/76* (2013.01); *E04H 4/1281* (2013.01); *G01F 23/292* (2013.01); *C02F 2103/42* (2013.01); *C02F 2209/42* (2013.01)

(58) Field of Classification Search
  CPC ............... B65D 43/0202; B65D 43/02; B65D 43/0231; B65D 43/0225; B65D 41/06; B65D 41/04; B25G 1/102; B25G 1/10; C02F 1/686; C02F 1/688; C02F 1/76; E04H 4/1281; G01F 23/292
  USPC .... 220/560, 212, 293, 288, 212.5, 756, 735; 215/228, 329, 316; 206/536, 535, 524.5, 206/524.1; 16/430; 441/32; 221/257, 221/256, 255, 210
  See application file for complete search history.

(56) References Cited

U.S. PATENT DOCUMENTS

| | | | | |
|---|---|---|---|---|
| 3,189,222 | A | * | 6/1965 | Smalley ............... B65D 83/049 221/220 |
| 3,325,052 | A | * | 6/1967 | Sauber ............... B65D 83/0409 141/112 |
| 3,383,013 | A | * | 5/1968 | Szekely ............... B65D 83/049 221/202 |
| 4,676,396 | A | * | 6/1987 | Mamolou ................ B65H 3/02 221/210 |
| 4,971,222 | A | * | 11/1990 | Rohde ..................... A47J 31/08 221/210 |
| 2008/0216503 | A1 | * | 9/2008 | Cantolino ............... F25D 21/14 62/285 |

\* cited by examiner

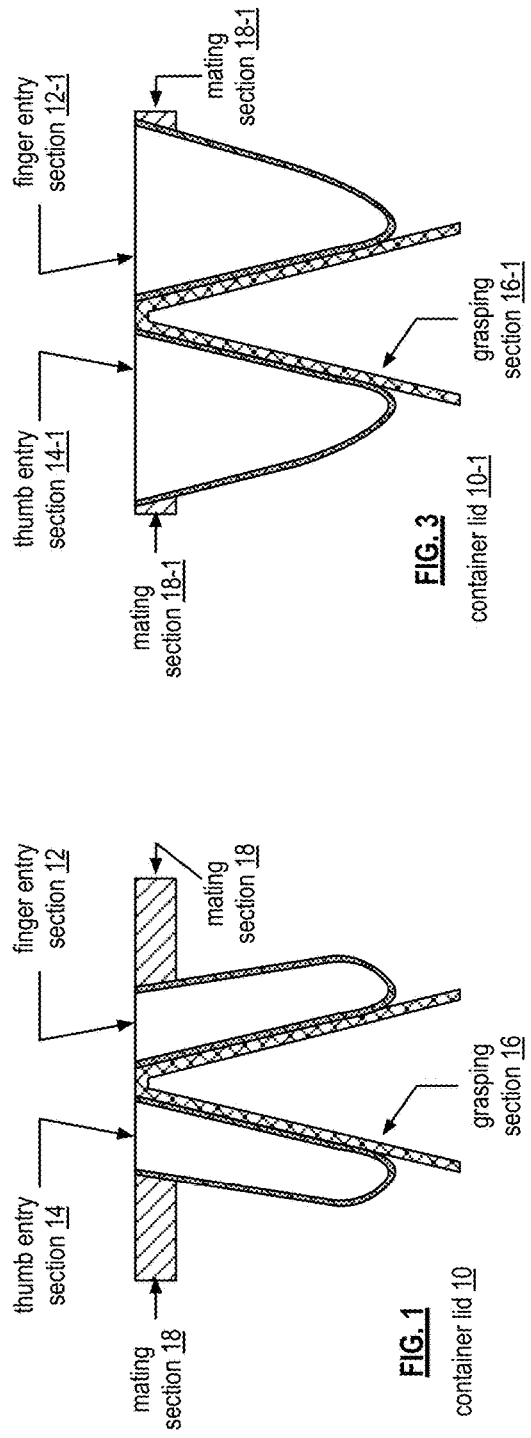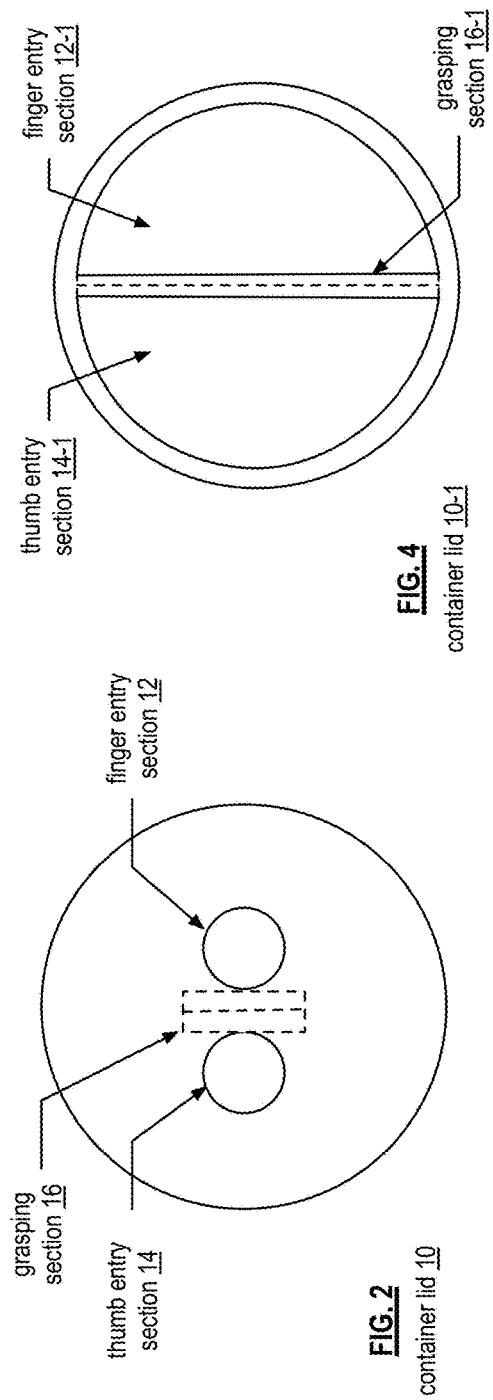

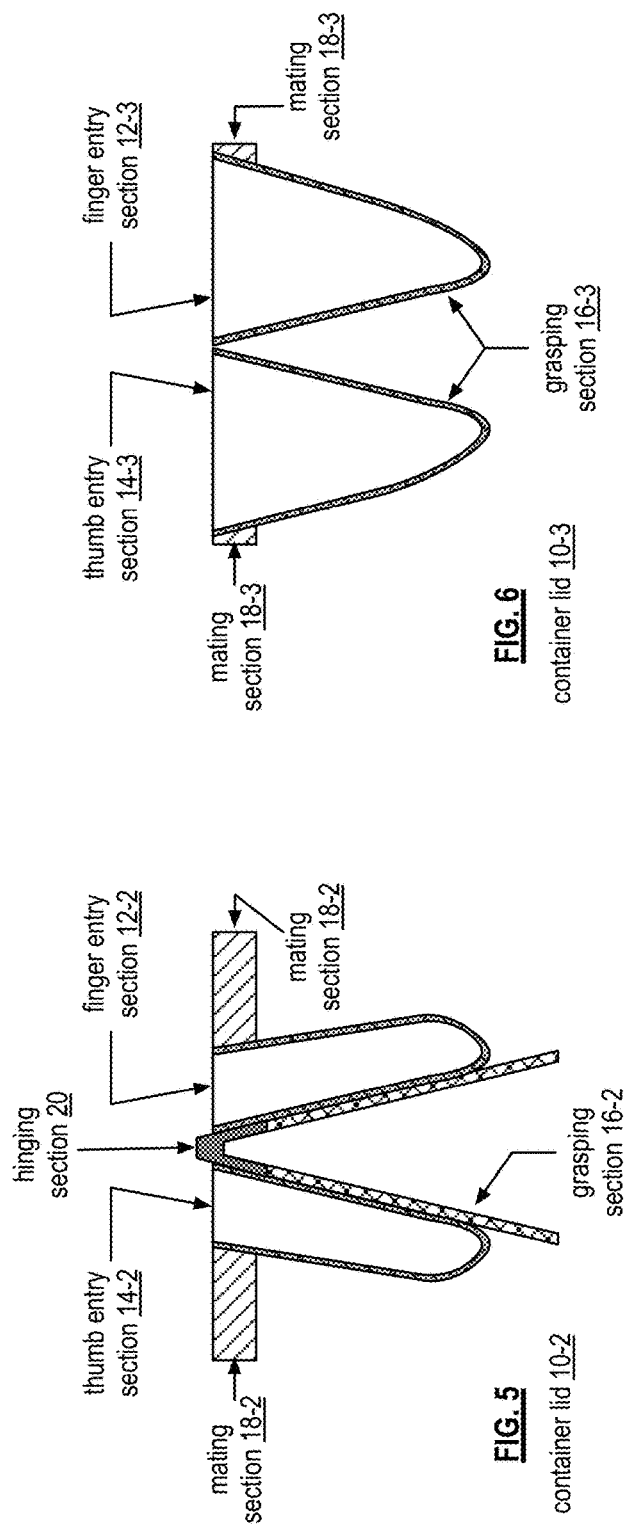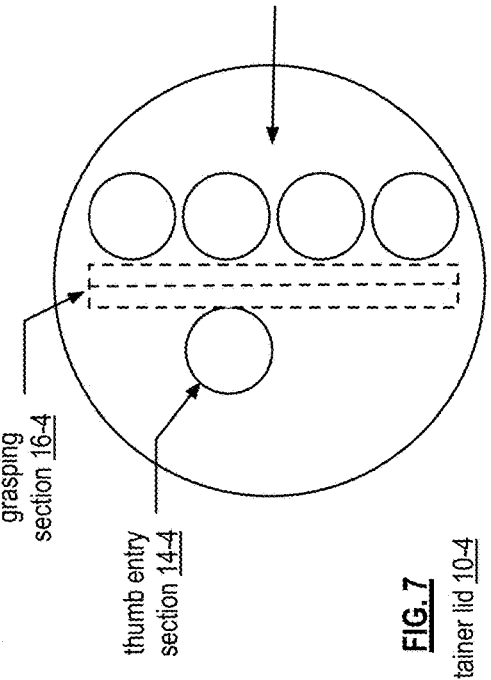

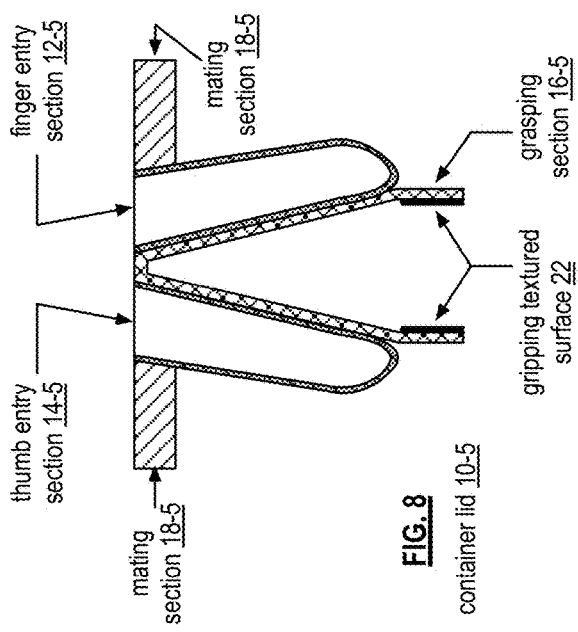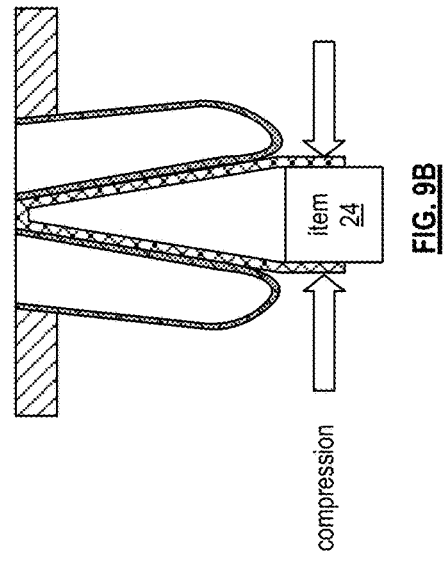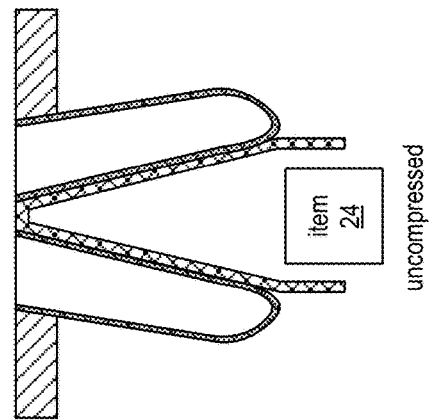

container 30-1 container 30

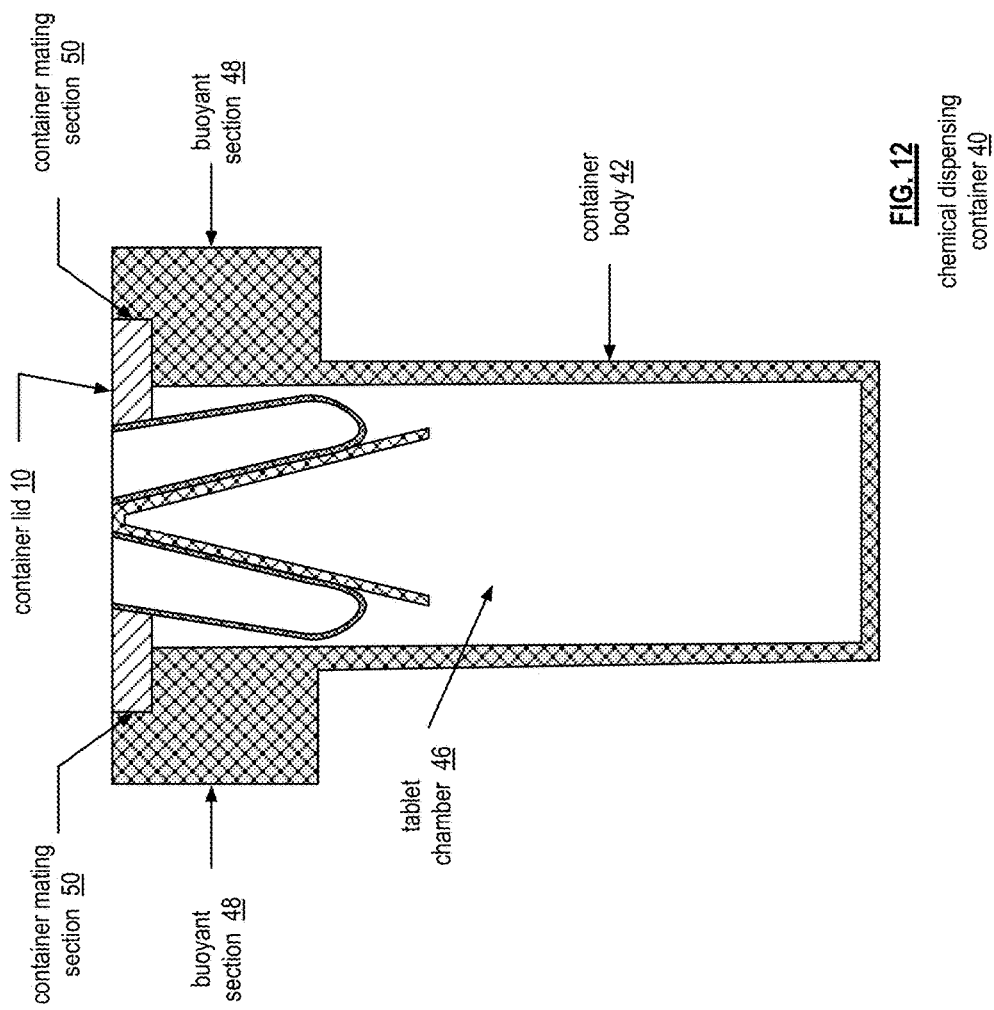

GRASPING CONTAINER LID AND APPLICATIONS THEREOF

CROSS REFERENCE TO RELATED PATENTS

The present U.S. Utility Patent Application claims priority pursuant to 35 U.S.C. § 119(e) to U.S. Provisional Application No. 62/400,741, entitled "Chemical Dispensing Systems", filed Sep. 28, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to containers and more particularly to container lids that allow for touch free handling of items.

Description of Related Art

Containers have a plethora of uses, including storing items that are mildly to severely toxic to humans. To add or remove such an item from a container, a person should wear protective gloves and/or uses tongs. While effective, the use of gloves and/or tongs requires them to be separately purchased from the container and/or the item(s).

As a specific example, a chemical dispensing system for swimming pools houses chemical tablets (e.g., chlorine tablets). When the chemical dispensing system is placed in a pool, the chemical dispensing system includes openings that exposes the chemical tablets to the water. When exposed, the chemical tablets slowly dissolve to maintain desired chemical levels of the water.

Such pool chemical tablets can be harmful to humans if the chemicals come into direct contact with the skin, is ingested, and/or comes into contact with the eyes. As such, pool chemical manufacturers recommend proper handling and storage of the chemical tablets.

BRIEF DESCRIPTION OF THE SEVERAL VIEWS OF THE DRAWING(S)

FIG. 1 is a cross-sectional view of an embodiment of a container lid in accordance with the present invention;

FIG. 2 is a top view of an embodiment of a container lid in accordance with the present invention;

FIG. 3 is a cross-sectional view of another embodiment of a container lid in accordance with the present invention;

FIG. 4 is a top view of another embodiment of a container lid in accordance with the present invention;

FIG. 5 is a cross-sectional view of another embodiment of a container lid in accordance with the present invention;

FIG. 6 is a cross-sectional view of another embodiment of a container lid in accordance with the present invention;

FIG. 7 is a top view of another embodiment of a container lid in accordance with the present invention;

FIG. 8 is a cross-sectional view of another embodiment of a container lid in accordance with the present invention;

FIGS. 9A and 9B are cross-sectional views of an example of a container lid grasping an item in accordance with the present invention;

FIG. 12 is a cross-sectional view of an embodiment of a chemical dispensing container in accordance with the present invention.

DETAILED DESCRIPTION OF THE INVENTION

Figure 11:
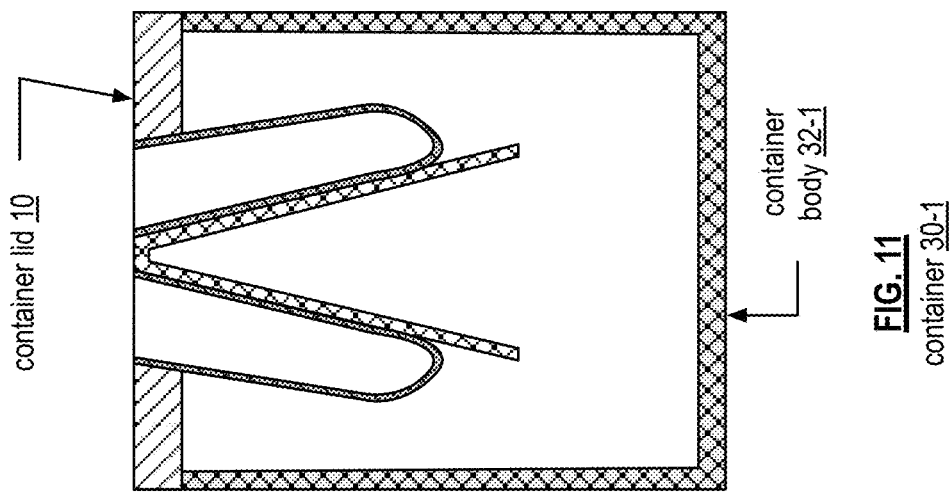
FIG. 11 is a cross-sectional view of another embodiment of a container in accordance with the present invention.

FIG. 1 is a cross-sectional view of an embodiment of a container lid 10 that includes a finger entry section 12, a thumb entry section 14, a grasping section 16, and a mating section 18. The finger entry section 12, the thumb entry section 14, and the grasping section 16 collectively form a mechanism for grasping an item, or items, without direct contact with the skin.

For example, one or more fingers of a hand is inserted into an opening in the finger entry section 12 and the thumb of the hand is inserted into an opening in the thumb entry section 14. With the thumb and finger(s) inserted, pressure is applied on the grasping section 16 to pick up and hold an item. An item is any substance, material, composite, chemical compound, and/or article for which it is desirable to avoid direct contact with the skin. As an example, it is desirable to avoid direct contact with the skin when the item includes one or more chemicals, bacteria, etc. that are harmful to humans. As another example, it is desirable to avoid direct contact with the skin when the item would stain the skin. As yet another example, it is desirable to avoid direct contact with the skin when the item would leave a smell on the skin.

The container lid 10 may be of a variety of sizes and composed of one or more of a variety of materials. For example, the container lid 10 is sized to mate with a small jar or container and includes a diameter of an inch or less. As another example, the container lid 10 is sized to mate with medium sized jar or container and includes a diameter of one to five inches. As another example, the container lid 10 is sized to mate with a large sized jar or container and includes a diameter over five inches.

The container lid materials include one or more of, but is not limited to, a plastic, a metal, and a rubber. The plastic is one or more of a polycarbonate (PC), polypropylene (PP), high-density polyethylene (HDPE), low-density polyethylene (LDPE), polyethylene terephthalate (PET), high-impact polystyrene (HIPS), polystyrene (PS), Acrylic, styrene acrylonitrile (SANS), etc. The metal is one or more of stainless steel, aluminum, copper, zinc, tin, etc. The rubber is one or more of Silicone rubber, Acrylonitrile-butadiene rubber, Hydrogenated butadiene rubber, Ethylene propylene diene rubber, Fluorocarbon rubber, Chloroprene rubber, Fluorosilicone rubber, Polyacrylate rubber, Ethylene Acrylic rubber, Styrene-butadiene rubber, Polyester urethane rubber, and Natural rubber.

In an embodiment, the finger entry section 12 includes a finger opening large enough to receive at least one finger of a hand and the thumb entry section 14 includes a thumb opening large enough to receive a thumb of the hand. The grasping section 16 is coupled (e.g., affixed, glued, mechanically coupling, integrated, molded, formed, etc.) to the finger entry section 12 and the thumb entry section 14. For example, the grasping section 16, the finger entry section 12, and the thumb entry section 14 are a molded piece, or a casted piece, comprised of the same material (e.g., a rubber and/or a malleable plastic). As another example, the grasping section 16 is a pair of metal or plastic tweezers that is screwed, glued, or otherwise adhered to the finger section 12 and the thumb section 14, which may both are comprised on a silicon rubber.

The mating section 18 is coupled to the finger entry section 12, the thumb entry section 14, and/or the grasping section 16. For example, the mating section 18 encircles the finger entry section 12, the thumb entry section 14, and/or the grasping section 16 as shown in FIG. 2. The mating section 18 includes a mating mechanism (e.g., threads, clasp(s), push-fit, etc.) for mating the container lid to a container body. While the container lid 10 is shown as round in FIG. 2, it could be another shape such as a square, an oval, a rectangle, a triangle or other polygon.

FIG. 3 is a cross-sectional view of another embodiment of a container lid 10-1 that includes a finger entry section 12-1, a thumb entry section 14-1, a grasping section 16-1, and a mating section 18-1. The finger entry section 12-1, the thumb entry section 14-1, and the grasping section 16-1 collectively form a mechanism for grasping an item, or items, without direct contact with the skin.

For example, the fingers of a hand are inserted into an opening in the finger entry section 12-1 and the thumb of the hand is inserted into an opening in the thumb entry section 14-1. With the thumb and finger(s) inserted, pressure is applied on the grasping section 16-1 to pick up and hold an item. Like container lid 10, container lid 10-1 may be of a variety of sizes and composed of one or more of a variety of materials.

In an embodiment, the finger entry section 12-1 includes a large finger opening to receive the fingers of a hand and the thumb entry section 14-1 includes a large thumb opening to receive a thumb of the hand. The grasping section 16-1 is coupled to the finger entry section 12-1 and the thumb entry section 14-1. The mating section 18-1 is coupled to the finger entry section 12-1, the thumb entry section 14-1, and/or the grasping section 16-1. For example, the mating section 18-1 encircles the finger entry section 12-1, the thumb entry section 14-1, and/or the grasping section 16-1 where the finger entry section 12-1 and the thumb entry section 14-1 occupy a majority of the mating section 18-1 as shown in FIG. 4. In particular, a combination of the finger entry section 12-1 and the thumb entry section 14-1 having a circular circumference, wherein the mating section 18-1 is integrated into the circular circumference.

FIG. 5 is a cross-sectional view of another embodiment of a container lid 10-2 that includes a finger entry section 12-2, a thumb entry section 14-2, a two-piece grasping section 16-2, a mating section 18-2, and a hinging section 20. The hinging section 20, which includes a hinge or similar mechanism, couples the two-piece grasping section 16-2 together. The finger entry section 12-2, the thumb entry section 14-2, the grasping section 16-2, and the hinging section 20 collectively form a mechanism for grasping an item, or items, without direct contact with the skin. Like container lid 10, container lid 10-2 may be of a variety of sizes and composed of one or more of a variety of materials.

FIG. 6 is a cross-sectional view of another embodiment of a container lid 10-3 that includes a finger entry section 12-3, a thumb entry section 14-3, a grasping section 16-3, and a mating section 18-3. The finger entry section 12-3 and the thumb entry section 14-3 are comprised of the same material (e.g., a silicon rubber) and form the grasping section 16-3. In an embodiment, the grasping section is integrated into the finger entry section and the thumb entry section and is able to grasp an item, or items, without direct contact with the skin. Like container lid 10, container lid 10-3 may be of a variety of sizes and composed of one or more of a variety of materials.

FIG. 7 is a top view of another embodiment of a container lid 10-4 that includes a finger entry section 12-4, a thumb entry section 14-4, a two-piece grasping section 16-4, a mating section 18-4. The finger entry section 12-4 includes a finger opening that has a series of opens to individually accommodate the fingers of the hand. The thumb entry section 14-4 includes a single hole to receive the thumb. Like container lid 10, container lid 10-4 may be of a variety of sizes and composed of one or more of a variety of materials.

FIG. 8 is a cross-sectional view of another embodiment of a container lid 10-5 that includes a finger entry section 12-5, a thumb entry section 14-5, a grasping section 16-5, and a mating section 18-5. The grasping section 16-5 includes an angular bend in each of its finger to better grasp an item. To further enhance the grasping section's 16-5 ability to grasp an item, the ends of the grasping section's fingers includes gripping textured surfaces 22. The gripping textured surfaces 22 may be integrated into the fingers of the grasping section 16-5 or adhered to the fingers. For example, a knurl pattern is molded or pressed into the fingers of the grasping section. As another example, a non-slip material is glued to the fingers of the grasping section. Like container lid 10, container lid 10-5 may be of a variety of sizes and composed of one or more of a variety of materials.

FIGS. 9A and 9B are cross-sectional views of an example of a container lid grasping an item 24. In FIG. 9A, the container lid is positioned over the item, but the finger and thumb entry sections have not yet been compressed. In FIG. 9B, the finger and thumb entry sections are compressed, squeezing the grasping section. The fingers of the grasping section grab the item and securely hold it for transporting.

Figure 10:
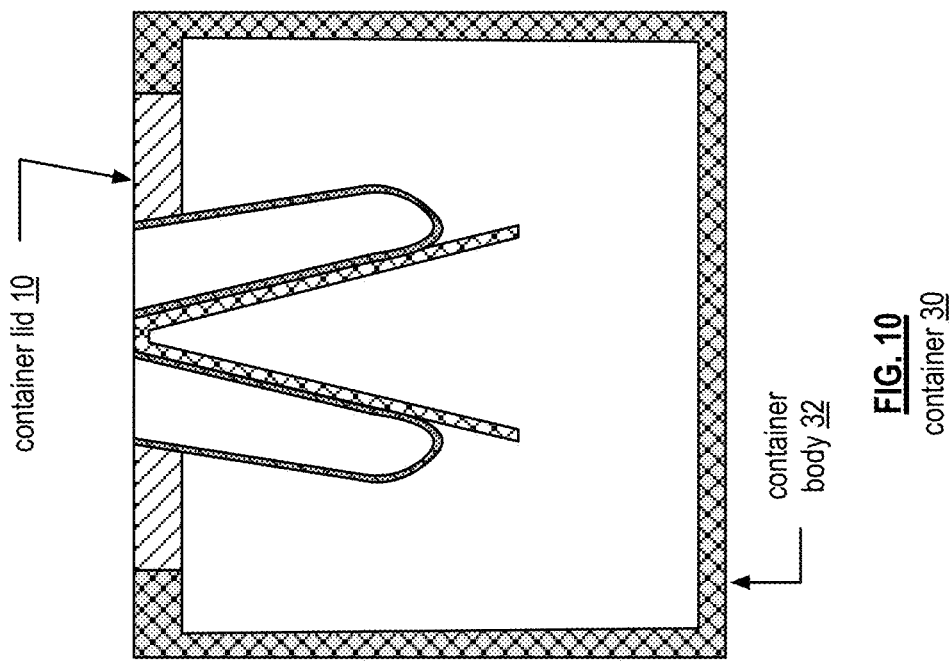
FIG. 10 is a cross-sectional view of an embodiment of a container in accordance with the present invention.

FIG. 10 is a cross-sectional view of an embodiment of a container 30 that includes a container body 32 and a container lid 10. The container lid 10 may be anyone of the embodiments discussed herein. The container body 32 may be a jar, a bottle, a tub, or other type of container. The container body 32 may be of a solid material to contain liquid and/or gases that may be associated with the items it is housing. Alternatively, the container body 32 may include perforations to allow moisture and/or gases to escape the container. The container body 32 is comprised of one or more materials that include one or more of, but is not limited to, a plastic, a metal, and a rubber.

In this embodiment, the outer circumference of the container body 32 is greater than the outer circumference of the container lid 10. As such, the container lid 10 mates with the container body 32 on a surface of the container body. The mating mechanism is a conventional mechanism for mating a lid with a container body such as a twist top, a pressure fit, a clasp, etc.

In another embodiment, the finger entry section, the thumb entry section, and the grasping section are removable from the mating section. When removed, the finger entry section, the thumb entry section, and the grasping section can easily fit within the container body 32 to extract or place one or more items.

FIG. 11 is a cross-sectional view of another embodiment of a container 30-1 that includes a container body 32-1 and a container lid 10. The container lid 10 may be anyone of the embodiments discussed herein. The container body 32-1 may be a jar, a bottle, a tub, or other type of container and is constructed in a similar manner as container body 32.

In this embodiment, the outer circumference of the container body 32-1 is approximately equal to the outer circumference of the container lid 10. As such, the container lid 10 mates with the container body 32 on an edge of the container body. The mating mechanism is a conventional mechanism for mating a lid with a container body such as a twist top, a pressure fit, a clasp, etc.

FIG. 12 is a cross-sectional view of an embodiment of a chemical dispensing container that includes a container lid 10 and a container body 42. The container body 42 includes a tablet chamber 46, a buoyant section 48, and a container mating section 50. The tablet chamber 46 houses water treatment chemical tablets (e.g., chlorine tablets) and provides a controlled dispersal of the water treatment chemical tablets into water (e.g., a swimming pool). The container lid 10 may be anyone of the embodiments discussed herein and allows for the water treatment chemical tablets to be grabbed from a bucket of tablets and inserted into the tablet chamber 46 without coming into direct contact with the skin.

The buoyant section 48 is coupled to the tablet chamber and functions to keep the chemical dispensing container 40 afloat in the water and in a desired orientation. The desired orientation has the tablet chamber 46 at least partially submerged in water and the container lid out of the water. The container mating section 50 is coupled to the tablet chamber 46 and/or the buoyant section 48 and provides the mating mechanism to mate with the container lid 10.

Figure 13A:
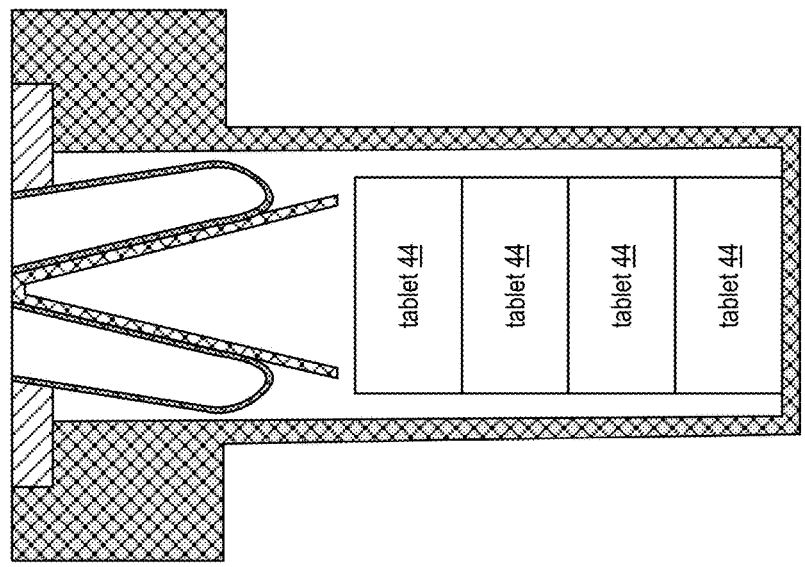
FIGS. 13A and 13B are cross-sectional views of an example of a container lid of a chemical dispensing container grasping an item in accordance with the present invention.
Figure 13B:
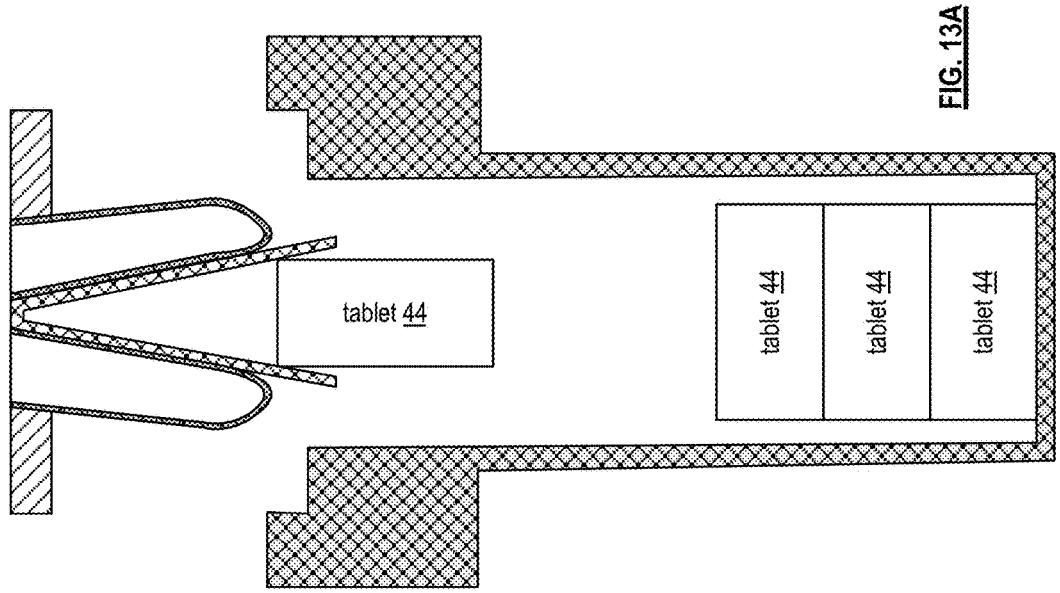

FIGS. 13A and 13B are cross-sectional views of an example of a container lid of a chemical dispensing container grasping a water treatment chemical tablet 44 and placing it in the tablet chamber 46. In FIG. 13A, the finger and thumb entry sections are compressed, squeezing the grasping section, which is holding the water treatment chemical tablet 44. The water treatment chemical tablet 44 is then placed in the tablet chamber. In FIG. 13B, the water treatment chemical tablet 44 has been placed in the tablet chamber and the container lid is secured to the container body.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A container lid for coupling to a container body, the container lid comprises:

a finger entry section having a finger opening for receiving at least one finger of a hand, wherein the finger entry section extends into the container body;

a thumb entry section having a thumb opening for receiving a thumb of the hand, wherein the thumb entry section extends into the container body;

a grasping section coupled to the finger entry section and the thumb entry section, wherein the grasping section functions to grasp an item within the container body when compressed via the finger entry section and the thumb entry section, and wherein the grasping section, finger entry section, and the thumb entry section prevents the at least one finger and the thumb from making direct contact with the item; and a mating section coupled to at least one of the finger entry section, the thumb entry section, and the grasping section, wherein the mating section functions to mate the container lid with the container body.

2. The container lid of claim 1 further comprises:
the finger entry section and the thumb entry section constructed of a first material; and
the grasping section constructed of a second material.

3. The container lid of claim 2, wherein the first material and the second material comprises different materials from a list of materials that includes: a plastic, a metal, and a rubber.

4. The container lid of claim 1 further comprises:
the finger entry section, the thumb entry section, and the grasping section constructed of a common material.

5. The container lid of claim 1 further comprises:
a hinging section coupling the grasping section, the finger entry section, and the thumb entry section together.

6. The container lid of claim 1, wherein the finger entry section comprises one or more of:
the finger opening having a first shape to accommodate one finger of the hand;
the finger opening having a second shape to accommodate all of the fingers of the hand; and
the finger opening having a series of openings to individually accommodate the fingers of the hand.

7. The container lid of claim 1 further comprises:
a combination of the finger entry section and the thumb entry section having a circular circumference, wherein the mating section is integrated into the circular circumference.

8. A container comprises:
a container body for housing one or more items; and
a container lid that is capable of mating to the container body, the container lid includes:
a finger entry section having a finger opening for receiving at least one finger of a hand, wherein the finger entry section extends into the container body;
a thumb entry section having a thumb opening for receiving a thumb of the hand, wherein the thumb entry section extends into the container body;
a grasping section coupled to the finger entry section and the thumb entry section, wherein the grasping section functions to grasp an item of the one or more items when compressed via the finger entry section and the thumb entry section, and wherein the grasping section, finger entry section, and the thumb entry section prevents the at least one finger and the thumb from making direct contact with the item; and
a mating section coupled to at least one of the finger entry section, the thumb entry section, and the grasping section, wherein the mating section functions to mate the container lid with the container body.

9. The container of claim 8, wherein the container lid further comprises:
the finger entry section and the thumb entry section constructed of a first material; and
the grasping section constructed of a second material.

10. The container of claim 8 further comprises:
the finger entry section, the thumb entry section, and the grasping section constructed of a common material.

11. The container of claim 8, wherein the container lid further comprises:
a hinging section coupling the grasping section, the finger entry section, and the thumb entry section together.

12. The container of claim 8, wherein the finger entry section comprises one or more of:
the finger opening having a first shape to accommodate one finger of the hand;
the finger opening having a second shape to accommodate all of the fingers of the hand; and
the finger opening having a series of openings to individually accommodate the fingers of the hand.

13. The container of claim 8 further comprises:
a combination of the finger entry section and the thumb entry section having a circular circumference, wherein the mating section is integrated into the circular circumference.

14. A chemical dispensing container comprises:
a container body for housing water treatment chemical tablets, wherein the container body includes:
a tablet chamber for housing the water treatment chemical tablets and providing a controlled dispersal of the water treatment chemical tablets into water;
a buoyant section coupled to the tablet chamber, wherein the buoyant section functions to keep the chemical dispensing container afloat in the water and in a desired orientation; and
a container mating section coupled to at least one of the tablet chamber and the buoyant section; and
a container lid that is capable of mating to the container body, the container lid includes:
a finger entry section having a finger opening for receiving at least one finger of a hand, wherein the finger entry section extends into the container body;
a thumb entry section having a thumb opening for receiving a thumb of the hand, wherein the thumb entry section extends into the container body;
a grasping section coupled to the finger entry section and the thumb entry section, wherein the grasping section functions to grasp an item when compressed via the finger entry section and the thumb entry section, and wherein the grasping section, finger entry section, and the thumb entry section prevents the at least one finger and the thumb from making direct contact with the item; and
a mating section coupled to at least one of the finger entry section, the thumb entry section, and the grasping section, wherein the mating section functions to mate with the container mating section.

15. The chemical dispensing container of claim 14, wherein the container lid further comprises:
the finger entry section and the thumb entry section constructed of a first material; and
the grasping section constructed of a second material.

16. The chemical dispensing container of claim 14 further comprises:
the finger entry section, the thumb entry section, and the grasping section constructed of a common material.

17. The chemical dispensing container of claim 14, wherein the container lid further comprises:
a hinging section coupling the grasping section, the finger entry section, and the thumb entry section together.

18. The chemical dispensing container of claim 14, wherein the finger entry section comprises one or more of:
the finger opening having a first shape to accommodate one finger of the hand;
the finger opening having a second shape to accommodate all of the fingers of the hand; and
the finger opening having a series of openings to individually accommodate the fingers of the hand.

19. The chemical dispensing container of claim 14 further comprises:
a combination of the finger entry section and the thumb entry section having a circular circumference, wherein the mating section is integrated into the circular circumference.

* * * * *